United States Patent
Lee

(10) Patent No.: US 7,184,590 B2
(45) Date of Patent: Feb. 27, 2007

(54) ALGORITHM SELECTOR

(75) Inventor: Harry C. Lee, Maitland, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 574 days.

(21) Appl. No.: 10/196,168

(22) Filed: Jul. 17, 2002

(65) Prior Publication Data

US 2004/0013300 A1 Jan. 22, 2004

(51) Int. Cl.
*G06K 9/00* (2006.01)

(52) U.S. Cl. ............... 382/181; 382/103; 382/254; 348/222.1

(58) Field of Classification Search ............ 382/162, 382/181, 302, 266, 299, 254, 103; 348/222.1, 348/315; 358/527
See application file for complete search history.

(56) References Cited

U.S. PATENT DOCUMENTS

| 5,048,095 A | 9/1991 | Bhanu et al. |
| 5,329,595 A | 7/1994 | Davies |
| 5,424,823 A | 6/1995 | Nettles et al. |
| 5,430,806 A | 7/1995 | Nettles et al. |
| 5,508,734 A * | 4/1996 | Baker et al. .............. 348/36 |
| 5,748,775 A | 5/1998 | Tsuchikawa et al. |
| 5,764,306 A * | 6/1998 | Steffano ................ 348/586 |
| 5,768,415 A * | 6/1998 | Jagadish et al. .......... 382/154 |
| 6,130,705 A * | 10/2000 | Lareau et al. ............ 348/144 |
| 6,592,071 B2 * | 7/2003 | Kinkead et al. .......... 244/7 R |

\* cited by examiner

*Primary Examiner*—Sheela Chawan
(74) *Attorney, Agent, or Firm*—Buchanan Ingersoll & Rooney PC

(57) ABSTRACT

A method and system for processing image data to identify characteristics of a captured scene. Image data corresponding to a captured scene is processed by processing algorithms to produce processed signals for use in identifying characteristics of the captured scene. A condition associated with the captured scene is determined. The processed signals are automatically selected as a function of the condition to produce a selected output. The selected output is used to identify characteristics of the captured scene.

23 Claims, 6 Drawing Sheets

ALGORITHM SELECTOR

BACKGROUND

1. Field of Invention

The present invention relates to processing of image data. More particularly, the present invention relates to a method and apparatus for selecting processed signals produced by detection algorithms based on conditions associated with scene processed by the detection algorithms.

2. Background Information

Historically, reconnaissance information has provided important information used in planning military operations. For example, prior to the advent of photography, scouts would be sent out to collect information regarding natural resources such as lakes and rivers, enemy troop information and the like. With the advent of photography, these scouts would provide reconnaissance information by capturing a scene of enemy installations, battlefields, and the like, using photographs. As technology advances, new methods are provided for collecting reconnaissance information. For example, it is quite common today to have reconnaissance planes, manned or remotely controlled, or satellites capture a scene for reconnaissance purposes. In addition to conventional photographic techniques, a scene can be captured using infrared detectors and the like.

Typically scenes captured by reconnaissance techniques have been analyzed by humans in order to determine the content of the captured scene. For example, a human would analyze a photograph to determine the location of bodies of water, the location of enemy troops and the location of man-made objects such as buildings and lines of communication. The human who analyzed the photograph would then have to relay the determined information to people in the field, for example, to an airplane pilot in order to identify targets. However, using humans to analyze photographs is very labor intensive. Further, there can be a considerable delay between the time when a scene is captured and the time in which the information in the captured scene is relayed to persons in the field.

Accordingly, it would be desirable to automate the analysis of images. Further, it would be desirable to provide mechanisms for determining whether the automated analysis is producing accurate results.

SUMMARY OF THE INVENTION

A system for processing image data. The system includes a processor. The processor includes an input which receives image data corresponding to a first scene, wherein the processor processes the image data using at least first and second processing algorithms to produce first and second processed signals for use in identifying characteristics of the first scene. The processor receives a condition associated with the first scene when the image data was captured. The processor automatically selects among the first and second processed signals as a function of the condition to produce a selected output. An output displays the selected output, the selected output identifying characteristics of the first scene.

A method for processing image data. The method includes receiving image data corresponding to a first scene. The image data is processed using at least first and second processing algorithms to produce first and second processed signals for use in identifying characteristics of the first scene. A condition associated with the first scene when the image data was captured is determined. An automatic selection among the first and second processed signals as a function of the condition to produce a selected output is performed. Characteristics of the scene are identified using the selected output.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein.

DETAILED DESCRIPTION

Figure 1:
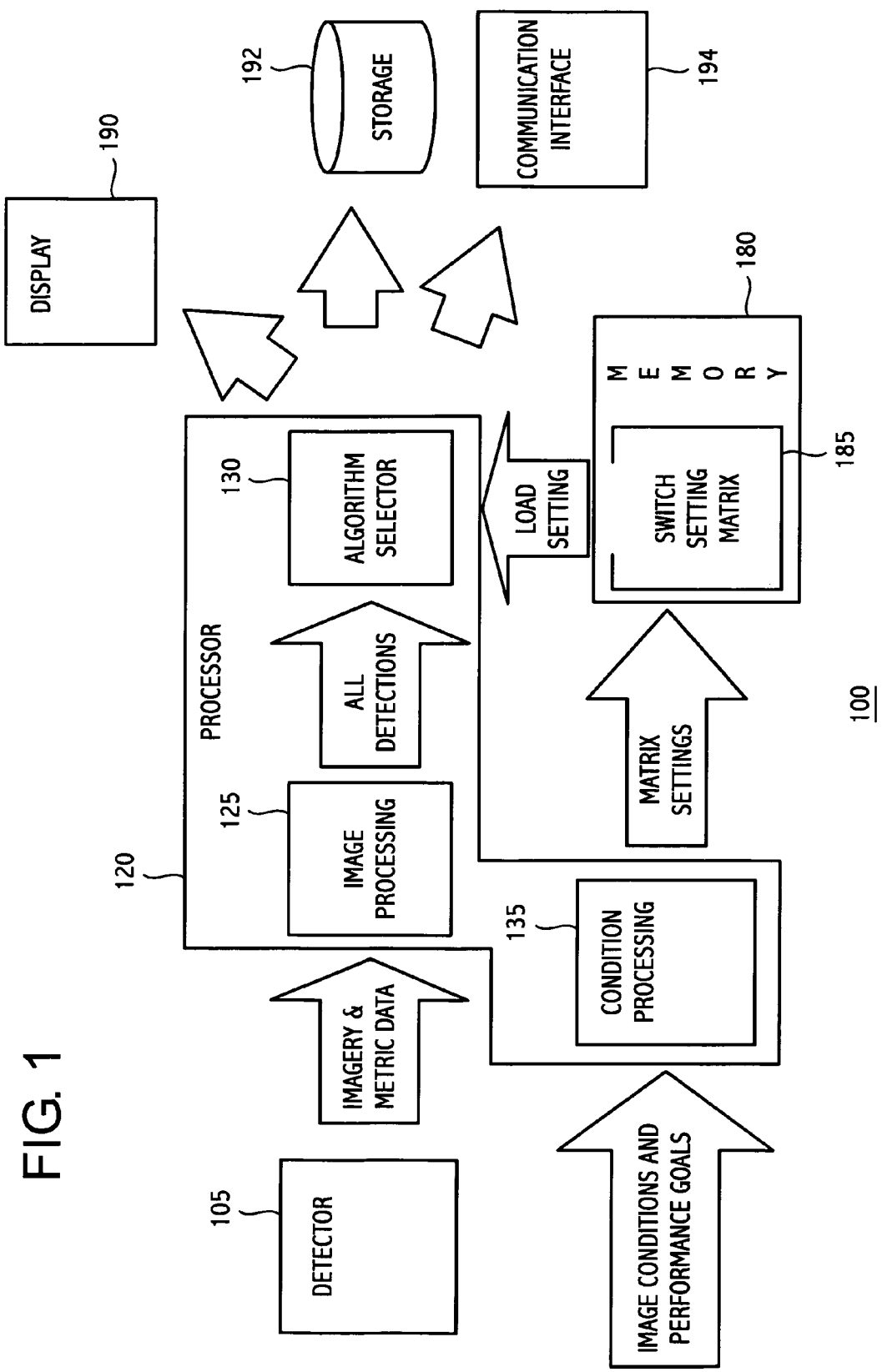
FIG. 1 is a block diagram of a system for processing image data in accordance with exemplary embodiments of the present invention.

FIG. 1 is a block diagram of a system 100 for processing image data in accordance with exemplary embodiments of the present invention. The system 100 includes a detector 105, a processor 120, a memory 180, a display 190, a storage unit 192 and a communication interface 194. The processor includes an image processing block 125, an algorithm selector 130 and a condition processing block 135. The memory 180 includes a switch setting matrix 185. The display 190 can be any type of display for outputting information in a human readable form including a cathode ray tube monitor, an LCD monitor, a printed piece of paper, or the like. Further, processor 120 can be hard-wired circuits, or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). Detector 105 can comprise an infrared imaging device, a thermal imaging device, a regular photographic device or the like. Memory 180 can be any type of memory including random access memory (RAM) electronically erasable memory (EPROM), or the like. Storage unit 192 can be any type of storage including magnetic or optical drives, a local drive or a network drive, and a floppy disk, hard drive, CD-ROM, DVD-ROM, DVD-RAM, or a tape drive. Communication interface can comprise any type of interface for connecting to a communication network, such as a data or voice network, a land-line or wireless network, or the like. It will be recognized that one of ordinary skill in the art would understand how to build a communication interface, and hence, a detailed description of this interface is omitted.

Detector 105 captures an image of a scene and provides the image to processor 120. In addition to the captured scene, the detector can provide metric data associated with the captured scene. The metric data can include geographic location, terrain type, ground sample distance, weather, viewing conditions, band frequency of the sensor band, degrees of freedom of the sensor, viewing angles, and/or positional vector. The image processing block 125 receives the captured scene and processes the associated image data using one or more processing algorithms to produce one or more processed signals. Specifically, the processing algorithms can be specifically designed to identify various objects in the image data such as bodies of water, vehicles, buildings or communication lines.

The processed signals are input to the algorithm selector 130. The algorithm selector automatically selects among the processed signals, each of the processed signals being associated with a different detection algorithm, based upon predetermined conditions. Specifically, condition processing block 135 receives conditions associated with the captured scene such as weather, time of day, type of terrain and temperature. In addition, a performance characteristic specifying the accuracy of the detections to be output from the processor 120 can be input to condition processing block 135. Based upon the conditions associated with the captured scene and the performance characteristic, the condition processing block 135 provides matrix settings to memory 180. Specifically, the matrix settings provided to memory 180 addresses certain switch settings stored in memory 180 based upon the conditions associated with the imaged scene and the performance characteristic. Accordingly, memory 180 provides the switch settings to the algorithm selector 130. Based upon the switch setting provided by memory 180, the terrain type algorithm selector outputs the detections based upon the conditions associated with the captured scene and the desired performance characteristic. The outputted detections are provided to display 190, storage unit 192 and/or communication interface 194.

Although the system in FIG. 1 is illustrated as including the display 190, storage unit 192 and communication interface 194, it will be recognized that the system can include any one or more of these output devices depending upon how the system is implemented. In addition, the storage unit 192 can be used in conjunction with the communication interface 194. For example, the detections selected by algorithm selector 130 can be stored in storage unit 192. If it is determined that there exists data in the selected detections which raise an alert due to, for example, detection of a particular characteristic in the processed image, the processed image along with the alert can be forwarded via communication interface 194 to another computer or the like.

Figure 2:
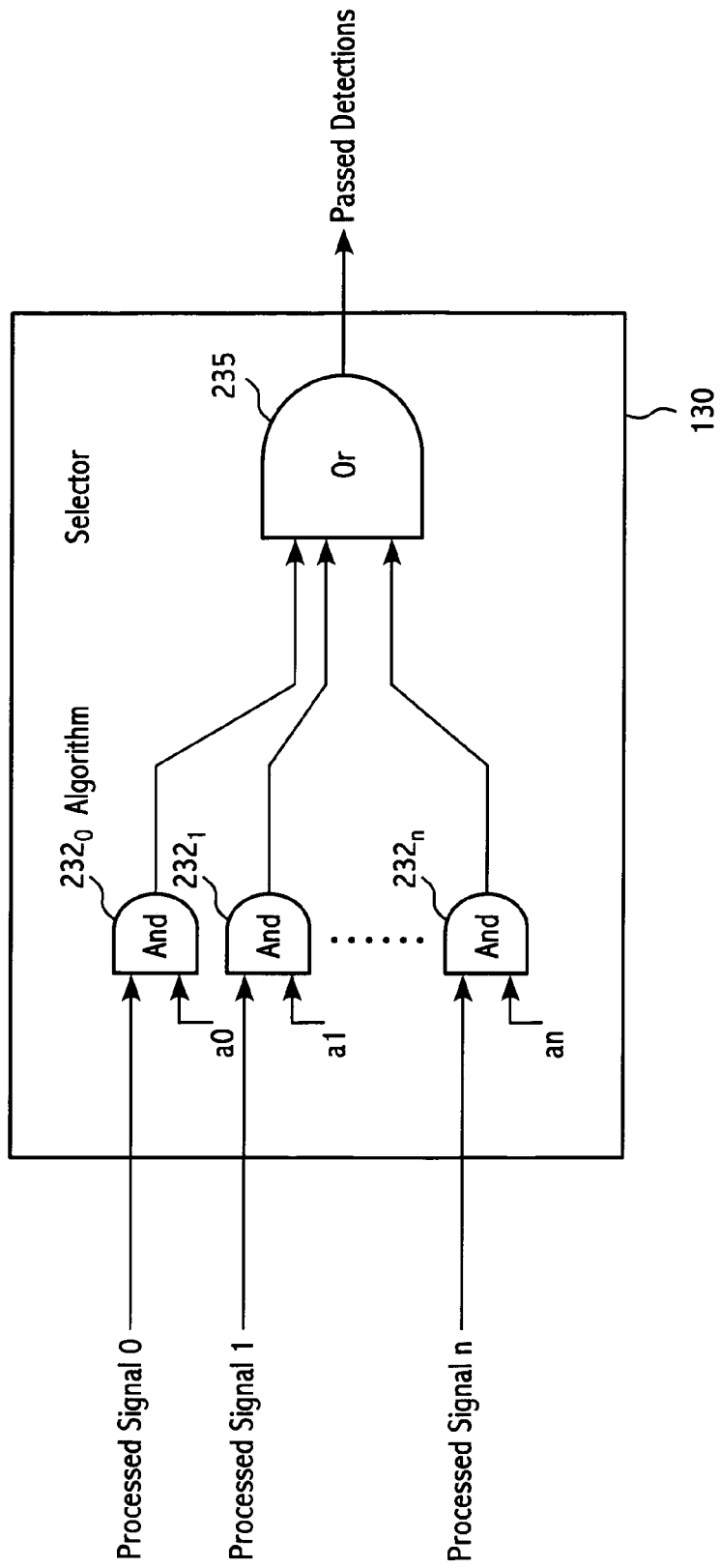
FIG. 2 is a block diagram of a switch for selecting signals processed by detection algorithms in accordance with exemplary embodiments of the present invention.

FIG. 2 illustrates in more detail the algorithm selector 130. The algorithm selector 130 includes a number of logical AND gates $232_0$–$232_n$ each receiving a respective Processed Signal$_0$–Processed Signal$_n$, the n processed signals each being associated with a different detection algorithm. The algorithm selector 130 also includes a logical OR gate 235 which receives an output from each of the n logical AND gates. The operation of the algorithm selector is as follows. A number of processed signals Processed Signal$_0$–Processed Signal$_n$ are respectively input to a number of logical AND gates $232_0$–$232_n$ Each of the number of logical AND gates $232_0$–$232_n$ also receives a second input from switch setting matrix 185 from memory 180. Based upon a value of the number of processed signals Processed Signal$_0$–Processed Signal$_n$ and a value of the output of the switch setting matrix 185, the logical AND gates outputs either pass the processed signal or block the processed signal from passing to the input of the logical OR gate 235. If one or more of the logical AND gates $232_0$–$232_n$ passes an output to the logical OR gate 235, the logical OR gate 235 provides the one or more processed signals to the output of the algorithm selector 130. If none of the logical AND gates $232_0$–$232_n$ passes an output to the logical OR gate 235, the logical OR gate 235 does not provide a processed signal to the output of the algorithm selector 130.

Figure 3:
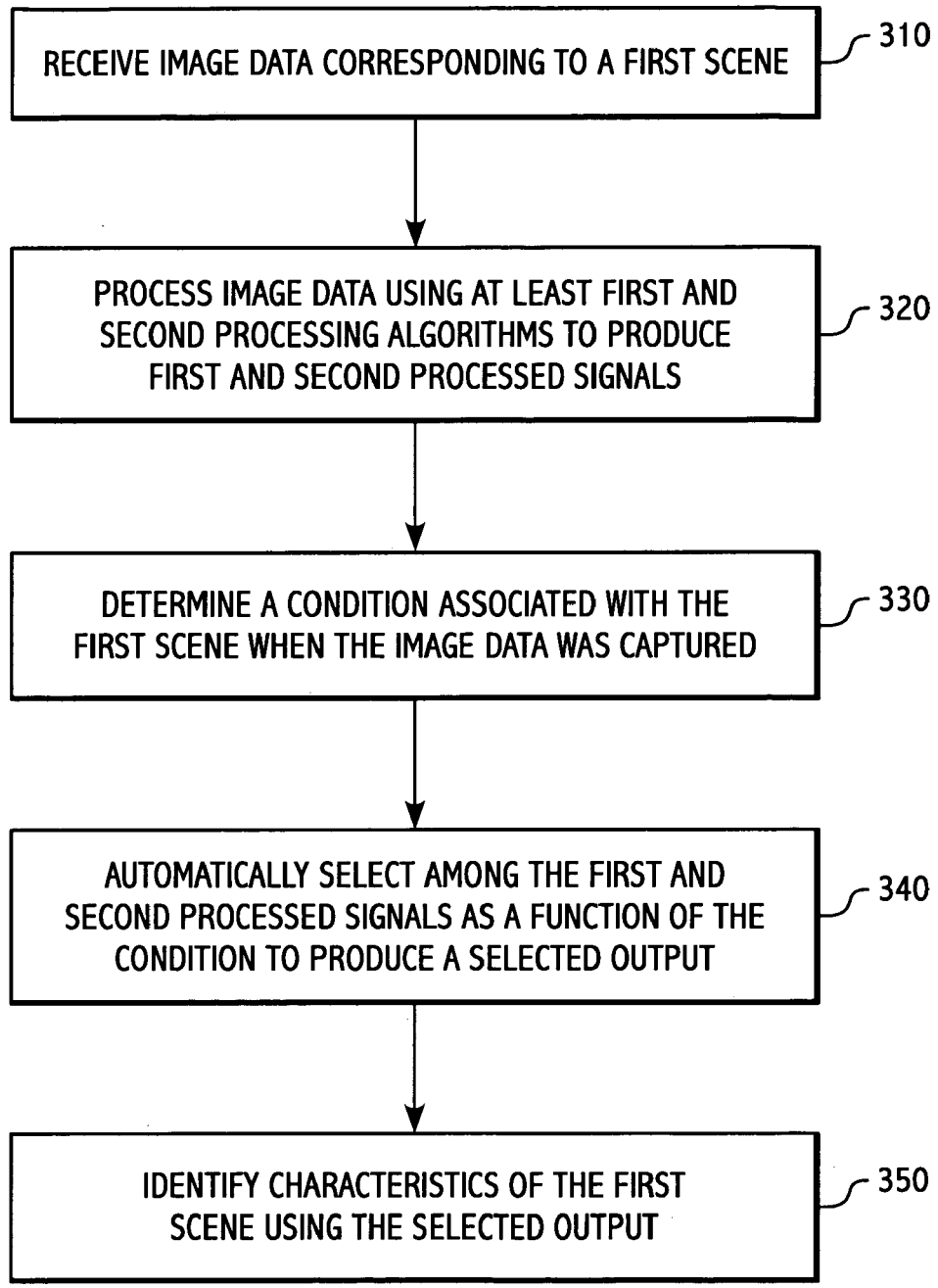
FIG. 3 is a flow chart illustrating the steps of processing image data in order to select one or more signals processed by detection algorithms in accordance with exemplary embodiments of the present invention.

FIG. 3 illustrates a method which employs the systems described in FIGS. 1 and 2 in accordance with exemplary embodiments of the present invention. Initially, the system receives image data corresponding to a first scene (step 310). The image data is then processed using at least a first and second processing algorithm to produce first and second processed signals (step 320). A condition associated with the first scene, when the image data was captured, is determined (step 330). The system, and more particularly the algorithm selector 130, automatically selects among the first and second processed signals as a function of the condition to produce a selected output (step 340). The selected output is then used to identify characteristics, e.g., the presence of building, vehicles, power lines, bodies of water, etc., of the first scene (step 350).

As discussed above in connection with FIGS. 1 and 2, whether the algorithm selector 130 selects a particular processed signal depends upon the settings provided to the algorithm selector by the switch setting matrix block 185. As also described above, the switch setting matrix 185 outputs a particular set of switch settings based upon a determination of condition processing block 135. Accordingly, one of ordinary skill in the art will recognize that the settings provided by the switch setting matrix block 185 should be optimized to pass only those processed signals which are processed by algorithms providing a predetermined degree of accuracy in processing the image data for identification of characteristics of the first scene based upon a condition associated with the first scene when the image data associated with the first scene was captured. Therefore, it is desirable to optimize the settings provided by the switch setting matrix 185 for particular conditions associated with the captured scene to achieve a predetermined performance characteristic in the identification of characteristics of the scene.

Figure 4:
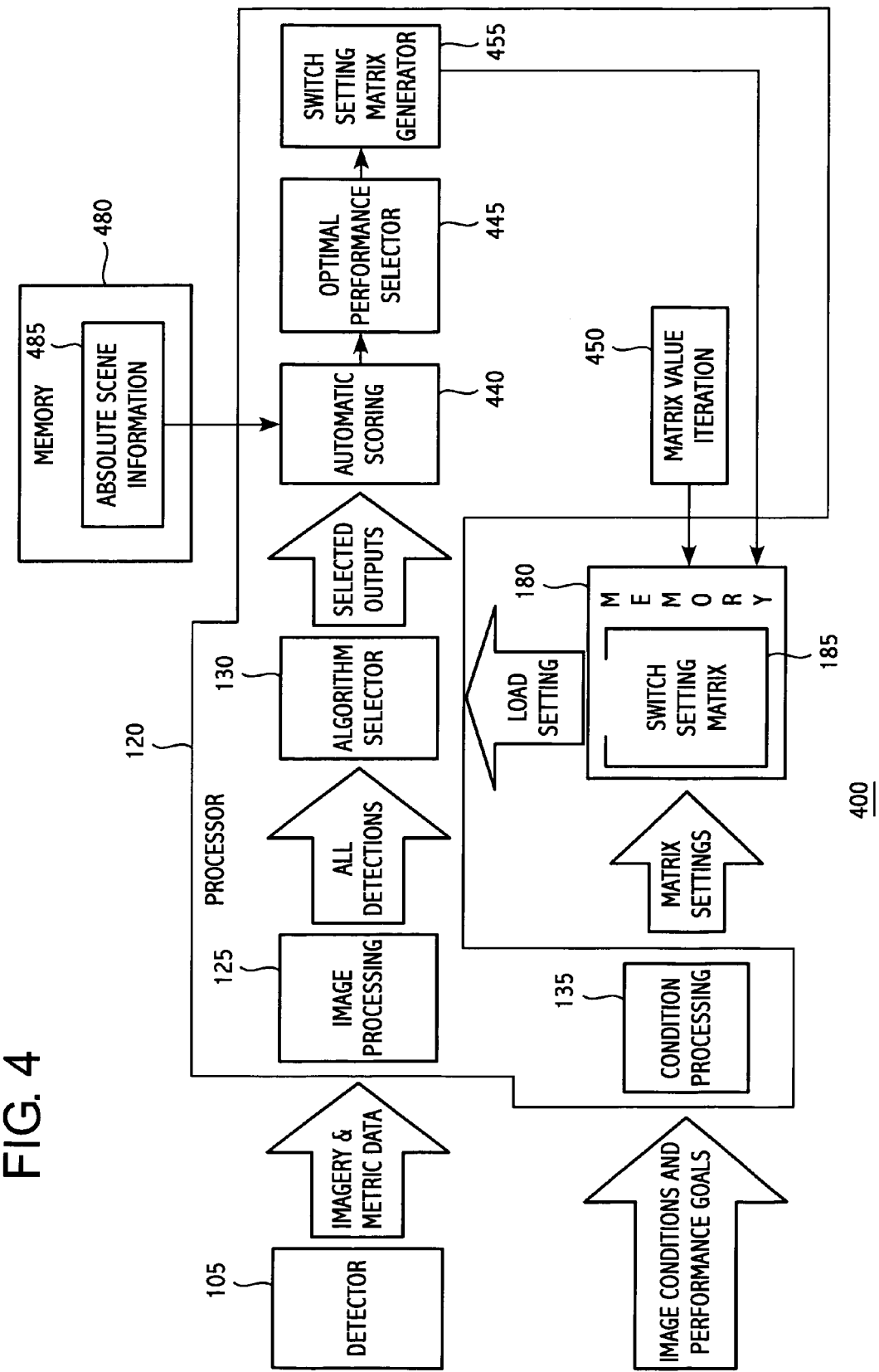
FIG. 4 is a block diagram of a system for determining optimized values for a switch setting matrix in accordance with exemplary embodiments of the present invention.

FIG. 4 is a block diagram of a system 400 optimizing the switch settings provided by the switch setting matrix 185 in accordance with exemplary embodiments of the present invention. Apart from display 190, storage unit 192, and communication interface 194 the system 400 includes all of the elements described above in connection with FIG. 1. However, the system illustrated in FIG. 4 can also include a display 190, a storage unit 192 and/or a communication interface 194. Accordingly, like elements are designated with like reference numerals, and a description of these like elements is omitted. The processor 120 further includes an automatic scoring block 440, an optimal performance selector 445, a matrix value iteration block 450, and a switch setting matrix generator 455. In addition, the system 400 also includes a memory 480 which includes an absolute scene information block 485.

In order to optimize the switch setting provided by switch setting matrix 185, an initial switch setting is provided by switch setting matrix 185 to algorithm selector. The switch setting matrix provides the initial switch setting to algorithm selector 130. The one or more processed signals output by the algorithm selector, using the initial switch setting, is compared to absolute scene information in automatic scoring block 440. Although FIG. 4 illustrates that the absolute scene information is contained in separate memory 480, it will be recognized that memory 480 can be part of memory 180. The comparison performed by automatic scoring block 440 provides a value which indicates the accuracy of the processed signals in identifying characteristics in the first scene captured by detector 105. The matrix values are then iterated to a next set of matrix values by matrix value iteration block 450. The next set of matrix values are provided by matrix value iteration block 450 to switch setting matrix 185.

The switch setting matrix 185 provides the next set of matrix values to algorithm selector 130. Based upon the particular values of the next set of matrix values, the algorithm selector selects and outputs one or more of the signals processed by image processing block 125. This process is repeated until all values of the switch setting matrix have been loaded by the matrix value iteration block into the switch setting matrix 185. After all values of the switch setting matrix have been iterated, the optimal performance selector 445 selects the algorithms which have produced an optimal performance in detecting characteristics in the first scene. The selected algorithms are provided by optimal performance selector 445 to switch setting matrix generator 455, which builds a switch setting matrix which will allow the algorithm selector to select the algorithms which provide the optimal performance in detecting characteristics in the first scene.

Figure 5:
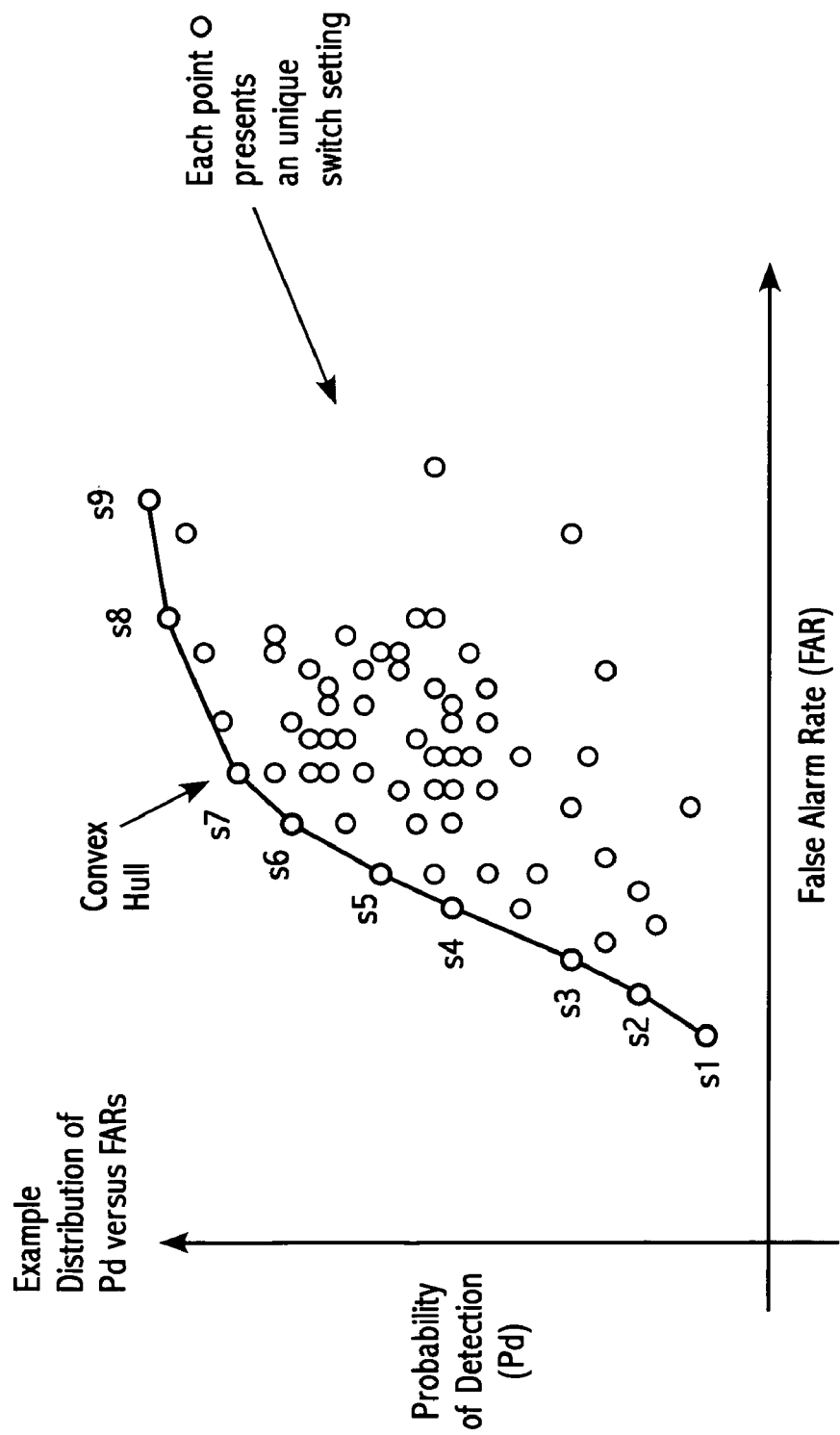
FIG. 5 is a graph illustrating the probability of detection versus the false alarm rate for different switch settings in accordance with exemplary embodiments of the present invention.

It will be recognized that for different applications there can be different criteria for what is considered optimal performance. FIG. 5 illustrates one set of exemplary criteria for determining a performance characteristic which achieves an optimal performance for the system. More specifically, FIG. 5 illustrates a graph of the probability of detection (Pd) versus the false alarm rate for a given set of detection algorithms. In FIG. 5 each point on the graph represents a particular switch setting in the switch setting matrix. A false alarm rate represents the probability that a portion of the image data in the first scene will be indicated as a characteristic of the first scene when in fact the portion of the image data does not contain a characteristic, i.e., a false detection.

Using these points, a convex hull algorithm is applied to the set of points to generate a convex hull of switch setting points. Convex hull algorithms are well known in the art, and hence, a detailed discussion of these algorithms is omitted for sake of clarity. Accordingly, for any particular application, a switch setting can be selected which provides a desired performance characteristic. For example, if detecting more characteristics of the first scene is desired, then switch setting S9 can be selected as the optimal performance. However, it will be noted that this switch setting will also produce a very high incidence of false alarms. Conversely, if a low number of false alarms is desired, switch setting S1 can be selected as providing the optimal performance. However, switch setting S1 will also produce a very low probability of detection of characteristics in the first scene. Accordingly, the selection of a particular switch setting will be a balance between the probability of detection and the rate of false alarms, and in many cases a switch setting such as switch setting S7 will be selected which provides a balance between the probability of detection and the false alarm rate.

Figure 6:
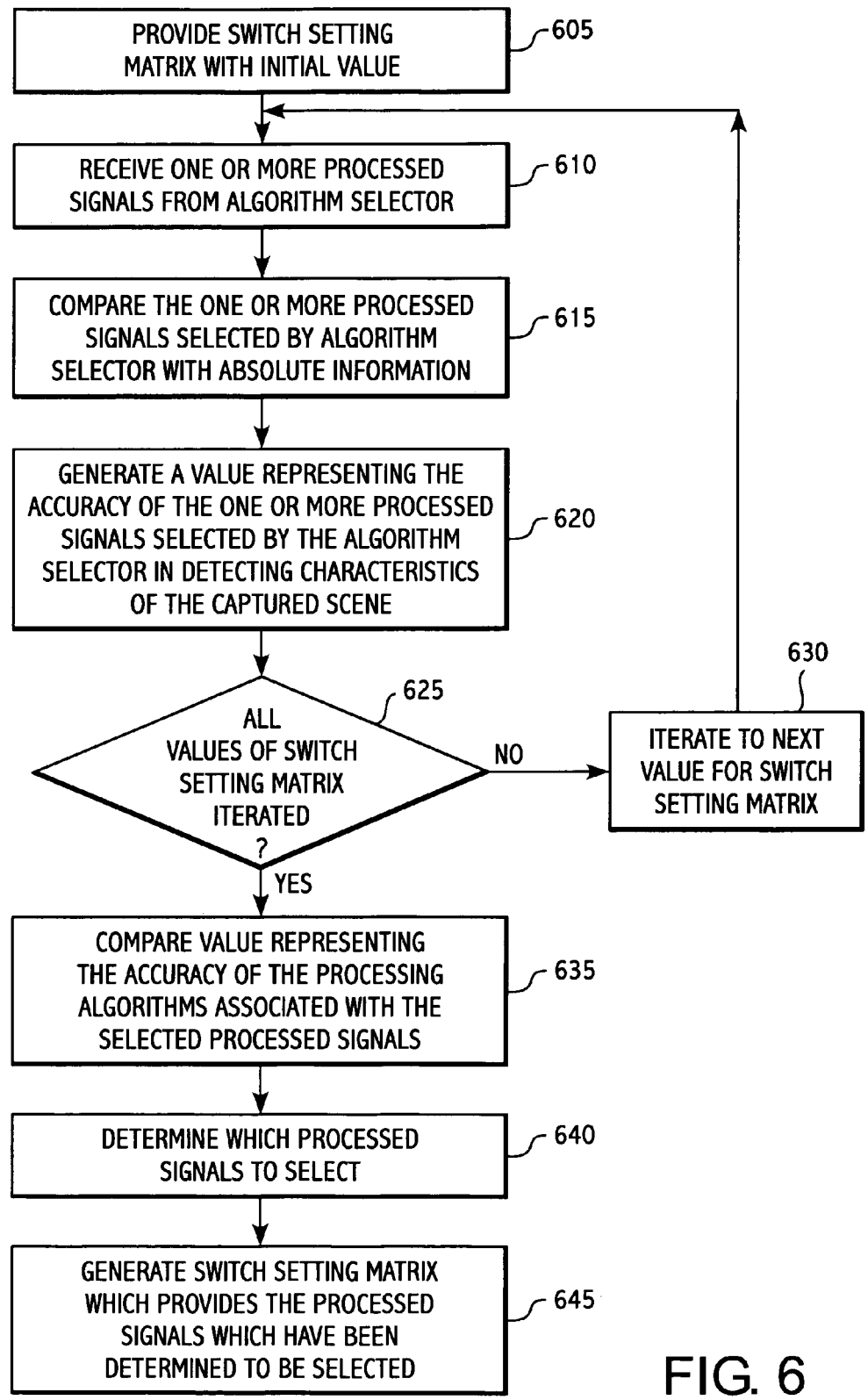
FIG. 6 is a flow chart illustrating the steps for determining the switch settings which provide an optimal performance in detecting characteristics of a scene.

FIG. 6 is a flow chart illustrating the method for generating the switch setting matrix based upon a given set of image conditions. Initially, the switch setting matrix is provided with an initial switch setting value (step 605). The automatic scoring block 440 receives the one or more processed signals from the algorithm selector (step 610) and compares the one or more processed signals with absolute information concerning the first scene (step 615). The automatic scoring block then generates a value representing the accuracy of the particular switch setting in detecting characteristics of the first scene (step 620). Next it is determined whether all values of the switch setting matrix have been iterated (step 625). If not all of the values of the switch setting matrix have been iterated ("No" path out of decision step 625), then the matrix value iteration block 450 iterates to a next value for the switch setting matrix (step 630) and the automatic scoring block generates a value representing the accuracy of the next value of the switch setting matrix in detecting characteristics of the first scene (steps 610–620). If, however, all values of the switch setting matrix have been iterated ("Yes" path out of decision step 625), then the values generated by the automatic scoring block 440, i.e., values representing the accuracy of the processing algorithms associated with the selected processed signals, are compared (step 635) to determine which processed signals to selected, and hence, which switch setting provides the optimal performance given a set of image conditions (step 640). Finally, a switch setting matrix which provides the optimal performance is generated using the determined switch setting (step 645).

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A system for processing image data comprising:
a processor, the processor comprising
an input which receives image data corresponding to a first scene, wherein the processor processes the image data using at least first and second processing algorithms to produce first and second processed signals for use in identifying characteristics of the first scene;
wherein the processor receives a condition associated with the first scene when the image data was captured; and
wherein the processor automatically selects among the first and second processed signals as a function of the condition to produce a selected output; and
an output for outputting the selected output, the selected output identifying characteristics of the first scene.

2. The system of claim 1, wherein the processor also processes the image data using third and fourth processing algorithms to produce third and fourth processed signals, and wherein the automatic selection is performed using the first, second, third and fourth processed signals.

3. The system of claim 2, wherein the selected output includes at least two of the first, second, third and fourth processed signals.

4. The system of claim 1, further comprising:
a detector which captures the first scene and provides the processor with the image data.

5. A system for processing image data comprising:
a processor, the processor comprising
an input which receives image data corresponding to a first scene, wherein the processor processes the image data using at least first and second processing algorithms to produce first and second processed signals for use in identifying characteristics of the first scene;

wherein the processor receives a condition associated with the first scene when the image data was captured; and wherein the processor automatically selects among the first and second processed signals as a function of the condition to produce a selected output; and an output for outputting the selected output, the selected output identifying characteristics of the first scene, wherein the processor processes the condition associated with the first scene to produce matrix settings, the system further comprising:

a memory which receives the matrix setting and provides the processor with a first and second switch setting.

6. The system of claim 5, wherein the processor further comprises:

a first logical AND gate which receives the first processed signal and the first switch setting;

a second logical AND gate which receives the second processed signal and the second switch setting; and a logical OR gate which receives an output of the first and second logical AND gates and outputs, wherein the processor automatically selects among the first and second processed signals based upon the first and second switch settings such that the output of the logical OR gate includes the selected output.

7. The system of claim 5, wherein the processor further receives a performance characteristic, and wherein the processor produces the matrix settings also based upon the performance characteristic.

8. The system of claim 7, wherein the performance characteristic is based upon a probability of detection of the characteristics of the first scene versus a rate of false alarms of characteristics of the first scene.

9. The system of claim 7, wherein the processor further comprises:

an input which receives absolute information identifying characteristics of the first scene, wherein the processor compares the selected output identifying characteristics of the first scene with the absolute information to generate a value, wherein the processor iteratively adjusts switch settings and compares the selected output of a set of switch settings with the absolute information to generate matrix settings for a particular set of conditions and performance characteristics.

10. The system of claim 9, wherein the selected output of at least one of the set of switch settings includes at least two processed signals.

11. A method for processing image data comprising the steps of:

receiving image data corresponding to a first scene;

processing the image data using at least first and second processing algorithms to produce first and second processed signals for use in identifying characteristics of the first scene;

determining a condition associated with the first scene when the image data was captured;

automatically selecting among the first and second processed signals as a function of the condition to produce a selected output; and identifying characteristics of the scene using the selected output.

12. The method of claim 11, wherein the image data is also processed by a third and fourth processing algorithms during the processing step to produce third and fourth processed signals, wherein the automatic selection is performed among the first, second, third and fourth processed signals.

13. The method of claim 12, wherein the selected output includes at least two of the first, second, third and fourth processed signals.

14. The method of claim 11, wherein the processed signals represent detection of objects in an image.

15. The method of claim 11, wherein each of the processed signals represents the result of a different detection algorithm.

16. The method of claim 15, wherein the different detection algorithms are selected from a group consisting of building detection algorithms, road detection algorithms, river detection algorithms, communication line detection algorithms, and vehicle detection algorithms.

17. The method of claim 16, wherein at least two of the processed signals represent the result of different building detection algorithms.

18. The method of claim 11, wherein the selection is further based upon a training operation, wherein the training operation comprises the steps of:

comparing each of the selected processed signals of the selected output to absolute information concerning the image data;

generating a value representing an accuracy of each of the processing algorithms associated with the selected processed signals using the comparison; and determining which processed signal to select based on the value representing the accuracy of the processing algorithms, wherein the automatically selecting step is performed based on the determination of which processed signal to select.

19. The method of claim 18, wherein the comparing, generating and determining steps are repeated for a plurality of different types of predetermined conditions such that the selection among the processed signals is performed automatically based upon the received predetermined condition.

20. The method of claim 18, wherein a result of the determination of which processed signal to select is a determination to select more than one processed signal.

21. A method for processing image data comprising the steps of:

receiving image data corresponding to a first scene;

processing the image data using at least first and second processing algorithms to produce first and second processed signals for use in identifying characteristics of the first scene;

determining a condition associated with the first scene when the image data was captured;

automatically selecting among the first and second processed signals as a function of the condition to produce a selected output; and identifying characteristics of the scene using the selected output, wherein the condition is selected from the group consisting of time of day, type of terrain, weather and temperature.

22. The method of claim 11, wherein the selection is also based upon a desired performance characteristic for the processed signals.

23. The method of claim 22, wherein the desired performance characteristic is based upon a probability of detection of an object by the processing algorithms versus a rate of false alarms for a detection of the object by the processing algorithms.

* * * * *